United States Patent
Guillaume et al.

(10) Patent No.: US 11,239,778 B2
(45) Date of Patent: Feb. 1, 2022

(54) STABILIZATION OF HYDRAULIC MACHINES WITH S-ZONE CHARACTERISTICS

(71) Applicant: GE Renewable Technologies, Grenoble (FR)

(72) Inventors: Renaud Guillaume, St Martin d'Hères (FR); Theophane Foggia, Grenoble (FR); Quentin Alloin, Grenoble (FR)

(*) Notice: Subject to any disclaimer, the term of this patent is extended or adjusted under 35 U.S.C. 154(b) by 0 days.

(21) Appl. No.: 16/484,431

(22) PCT Filed: Feb. 9, 2018

(86) PCT No.: PCT/EP2018/053330
§ 371 (c)(1),
(2) Date: Aug. 7, 2019

(87) PCT Pub. No.: WO2018/146273
PCT Pub. Date: Aug. 16, 2018

(65) Prior Publication Data
US 2019/0372495 A1    Dec. 5, 2019

(30) Foreign Application Priority Data

Feb. 9, 2017 (EP) .................................. 17290014

(51) Int. Cl.
*F03B 13/00* (2006.01)
*F03B 13/10* (2006.01)
(Continued)

(52) U.S. Cl.
CPC .............. *H02P 9/105* (2013.01); *F03B 3/103* (2013.01); *F03B 11/04* (2013.01); *F03B 13/10* (2013.01);
(Continued)

(58) Field of Classification Search
CPC .......... F03B 3/103; F03B 11/04; F03B 13/10; F03B 15/005; H02P 9/04; H02P 9/105
See application file for complete search history.

(56) References Cited

U.S. PATENT DOCUMENTS 1,994,418 A * 3/1935 Muller .................. H02J 3/42
307/87
3,924,140 A * 12/1975 Yannone .............. H02P 9/04
290/40 R
(Continued)

FOREIGN PATENT DOCUMENTS

DE      14 26 597 A1    11/1969
EP      2 818 692 A1    12/2014
(Continued)

OTHER PUBLICATIONS

Gregor Paul heckel Smueller: Application of Varible Speed Operation on Francis Turbines, vol. 35, No. 1, Apr. 1, 2015, pp. 12-16.
(Continued)

*Primary Examiner* — Tulsidas C Patel
*Assistant Examiner* — Thomas K Quigley
(74) *Attorney, Agent, or Firm* — Dority & Manning, P.A.

(57) ABSTRACT

This method for stabilizing the rotation speed of a hydraulic machine having S-characteristic and comprising a distributor (9) is adapted to modify a water flow, so that the machine can be coupled to a grid. The method comprises the steps of calculating an orientation of the distributor (9); and orienting the distributor according to the calculated orientation. The method further comprises the steps of providing an electric torque to the machine so as to reach a target speed.

17 Claims, 5 Drawing Sheets

(51) Int. Cl.
    *H02P 9/10*           (2006.01)
    *F03B 3/10*            (2006.01)
    *F03B 11/04*          (2006.01)
    *F03B 15/00*          (2006.01)
    *H02P 9/04*           (2006.01)
    *H02P 101/10*        (2015.01)

(52) U.S. Cl.
    CPC .............. *F03B 15/005* (2013.01); *H02P 9/04* (2013.01); *F05B 2270/1014* (2013.01); *F05B 2270/327* (2013.01); *H02P 2101/10* (2015.01)

(56) References Cited

U.S. PATENT DOCUMENTS

| | | | | |
|---|---|---|---|---|
| 4,031,407 A | * | 6/1977 | Reed | H02J 3/42 307/87 |
| 4,283,634 A | * | 8/1981 | Yannone | F02C 9/26 290/40 R |
| 4,370,560 A | * | 1/1983 | Faulkner | F02C 9/58 290/40 C |
| 10,415,540 B2 | * | 9/2019 | Alloin | F03B 3/02 |
| 2011/0288731 A1 | * | 11/2011 | Minto | F01D 15/08 701/54 |
| 2017/0268477 A1 | * | 9/2017 | Alloin | F03B 15/14 |
| 2017/0268478 A1 | * | 9/2017 | Alloin | F03B 3/06 |

FOREIGN PATENT DOCUMENTS

| | | |
|---|---|---|
| WO | WO 2016/016149 A1 | 2/1916 |
| WO | WO 2016/087458 A1 | 6/1916 |
| WO | WO 00/39458 A1 | 7/2000 |
| WO | WO 2012/129581 A2 | 10/2012 |

OTHER PUBLICATIONS

PCT Search Report, dated May 2, 2018.
EP Search Report, dated Jul. 27, 2017.

* cited by examiner

STABILIZATION OF HYDRAULIC MACHINES WITH S-ZONE CHARACTERISTICS

The invention relates to a method for stabilizing the rotation speed of a hydraulic machine with S-characteristics. Typical hydraulic machines with S-characteristics are hydro-power plants having a pump-turbine that exhibits S-shaped characteristics in a turbine operation region. The invention also concerns an installation or apparatus for converting hydraulic energy into electrical energy, in which this method may be implemented.

During a pump-turbine start-up in turbine mode, the rotation speed of the machine must be stabilized so that the machine can be coupled to the grid. The coupling is typically achieved by closing a main circuit breaker. Ideally, the rotation speed of the machine is synchronized with the grid frequency. Besides, the pump-turbine is piloted so as to work at no load operating point at which the hydraulic torque applied by the water flow on the runner is null.

Rotational speed stabilization may be hard to reach because of the presence of "S-zones". "S-zones" are zones in a graph representing the unit torque against the unit rotational speed of the machine for several iso-openings, for example, the position of the guide vanes of a hydro-turbine. On this kind of graph, it can be seen that the iso-opening curve of the unit torque plotted over the unit rotational speed may be "S-shaped", thereby indicating that the no load operating point is unstable. The "S-zones" are defined as all operating points where the slope of the curve is reversed. This means that a slight variation of the rotation speed of the machine relative to the nominal speed operating point results in a significant increase of the torque applied on the runner of the pump-turbine. This substantially increases or decreases the rotation speed of the machine. Under these conditions, it is not possible to stabilize the rotational speed of the hydraulic machine with a conventional Proportional Integral Derivative (PID) loop.

It is generally acknowledged that S-zones are due to the shape of the hydraulic parts of the machine. Accordingly, it has been proposed to completely redesign the hydraulic parts of the machine, such as the runner or the guide vanes. In particular, the hydraulic parts of the machine are redesigned to avoid the presence of S-zones in the operating range of the pump-turbine in turbine mode. The operating range of a machine corresponds to the interval between the minimum gross head and the maximum gross head of an installation which will incorporate the machine. However, this solution is very expensive to implement and may reduce the performance of the pump-turbine.

Another solution consists in equipping the pump-turbine with non-synchronized guide vanes. This means that some guide vanes can be oriented independently of other guide vanes. As a result, at machine start-up, some of the guide vanes are opened more than others, which temporarily modifies the machine characteristics. This avoids the presence of S-zones in the operating range of the machine before coupling the machine to the grid. Nevertheless, this solution generates unwanted vibrations which has a negative effect on the behavior of the machine.

European Patent Application Publication Number EP 2 818 692 A1 discloses a system in which the rotational speed of a pump-turbine is compared with an optional rotational speed. The system is arranged to orientate guide vanes so that the actual rotational speed is modified to correspond to the optimal rotational speed. However, the system of EP 2 818 692 A1 is unable to connect the stator winding directly to the grid in order to provide power to the grid in generation mode or store power from the grid in pump mode.

Further methods for stabilizing the rotation speed of a hydraulic machine are described in the prior art. The methods include using a control loop feedback system having a guide vane controller that regulates orientation of the guide vanes according to a speed difference between the rotation speed of the hydraulic machine and the target rotation speed. Such a method uses an iterative method for successively generating regulation parameters to stabilize the rotation speed. Reference can be made to WO 2016/087458 which discloses such a method.

Reference can also be made to WO 2016/016149 in which the opening of guide vanes is adjusted by calculating setpoint openings for the guide vanes depending on the speed difference between the target rotation speed and the real rotation speed. The calculation also depends on net head conditions by calculating a height difference between a target net head and a real net head.

The methods disclosed in WO 2016/087458 and WO 2016/016149 permit to reduce the amplitude of the speed oscillation due to the S-characteristics.

The invention thus intends to solve the problems associated with the prior art by proposing a method and an apparatus to stabilize the rotation speed of the machine for the whole functioning range of the machine. The invention is arranged to connect the machine to the grid once stabilization is achieved.

According to a first aspect of the present invention there is provided a method for stabilizing the rotation speed of hydraulic machine with S-characteristics. The method is preferably suitable for coupling the machine to an electricity grid. The machine preferably comprises a distributor adapted to modify a water flow. The method preferably comprises the steps of: calculating an orientation of the distributor and/or orienting the distributor according to the calculated orientation.

According to one feature of the invention, the method may further comprise a step of providing an electric torque to the machine so as to reach a speed target.

Accordingly, thanks to the invention, a positive or a negative electric torque, namely a motor torque or a braking torque can be provided to the machine so as to increase or reduce the rotation speed of the machine to reach the speed target.

According to another feature of the invention, the electric torque is preferably provided using a control loop feedback system having a control loop comprising an electric power source and preferably a controller for controlling the electric power source so as to reduce a speed difference between a measured rotation speed of the machine and a target rotation speed.

In one preferred embodiment, electric power may be provided using a variable-frequency drive connected to the grid and to an alternator. A variable-frequency drive may be a static frequency converter. A static frequency converter may be a voltage source inverter or a current source inverter.

In one embodiment of the invention, electric power may be provided using a battery connected to an alternator. Preferably, the electric power may be provided by a power conversion DC/AC unit.

Electric power may in addition be provided using a variable-frequency drive connected to a grid which may be the same electricity grid referred to above or a different grid, and to an alternator and a battery connected to the alternator.

According to another preferred feature of the invention, the control loop feedback system provides a coarse regulation in which the speed difference is reduced by orienting the guide vanes and a fine regulation in which the speed difference is reduced by providing an electric torque to the machine.

According to another aspect of the present invention there is provided an installation for converting hydraulic energy into electrical energy. The installation preferably comprises a hydraulic machine with a distributor receiving the hydraulic energy and adapted to modify a water flow. The machine preferably comprises a rotor intended to be rotated in operation by the hydraulic energy, and may also comprise a control loop feedback system comprising a controller for calculating an orientation of the distributor and for orienting the distributor according to the calculated orientation. The installation may further comprise means for providing an electric torque to the rotor so as to reach a target speed.

In one embodiment, the control loop feedback system may comprise a control loop having an electric power source and a controller for controlling the electric power source so as to reduce said speed difference between a measured rotation speed of the machine and a target rotation speed.

The electric power source may comprise a variable-frequency drive intended to be connected to a grid and to an alternator comprising said rotor.

In one preferred embodiment, said electric power source may comprise a battery intended to be connected to an alternator comprising said rotor.

The electric power source may comprise, in one embodiment, a variable-frequency drive intended to be connected to a grid and preferably to an alternator comprising said rotor and a battery intended to be connected to the alternator.

According to another aspect of the present invention there is provided a method of stabilizing the rotation speed of a hydraulic machine. Preferably the machine is in turbine mode, and the machine may have S-characteristics. The machine may comprise a distributor adapted to modify a water flow. The method may comprise one or more of the steps of (i) calculating a speed difference between the rotational speed of the hydraulic machine and a target rotational speed; (ii) orienting the distributor according to an orientation; and (iii) applying an electric torque to the machine corresponding to the speed difference. Advantageously, the electric torque stabilizes the rotation speed of the hydraulic machine so that it may be coupled to an electricity grid.

Preferably, the step of coupling the hydraulic machine to the grid may comprise opening an electric torque circuit breaker which may be located between the source of the electric torque and the machine. The step of coupling the hydraulic machine to the grid may comprise closing a grid circuit breaker which may be located between the machine and the grid.

The speed difference may be processed to calculate the orientation of the distributor.

The method may comprise processing the speed difference and outputting an orientation control set-point which may correspond to the speed difference. Preferably, the orientation control set-point may be received by an actuator to orientate the distributor.

The speed difference may be processed by control apparatus which may comprise an electric torque controller. The electric torque may be provided by an electric power source to reduce the speed difference. The electric power source may be powered by and/or connected to a grid which may be the same electricity grid that the machine may be coupled to or an alternative grid.

The source of the electric torque may be a variable-frequency drive. The electric torque may be provided by a battery, which may be in combination with the variable-frequency drive and or the electric power source.

The step of orienting the distributor according to the orientation may provide a coarse regulation in which stabilization is partially achieved. Preferably, applying an electric torque to the machine may provide a fine regulation in which stabilization is completed. In this way the coarse regulation may achieve a greater portion of the stabilization, and the fine regulation may complete the stabilization.

According to a further aspect of the invention, there is provided a system for converting hydraulic energy into electrical energy. The system preferably comprising one or more of the following: (i) a hydraulic machine which preferably comprises a distributor adapted to modify a water flow, and preferably a rotor which, in use, is rotated by the hydraulic energy; (ii) a first control loop preferably arranged to calculate an orientation of the distributor and which may orientate the distributor according to the calculated orientation; and (iii) a second control loop for providing an electric torque to the rotor so as to reach a target rotation speed.

The system may further comprise control apparatus arranged to output an orientation set point. The control apparatus may be arranged to process a speed difference between the rotational speed of the hydraulic machine and the target rotation speed.

The first control loop preferably comprises an actuator arranged to orientate the distributer. The actuator is preferably arranged to orientate the distributer according to an orientation which corresponds to an optimum orientation of the distributer.

Preferably, the second control loop may comprise an electric power source arranged to provide the electric torque to the machine to reduce the speed difference. The system preferably comprises an electric source circuit breaker which may be located between the electric power source and the machine.

The system may comprise a grid circuit breaker which may be located between the machine and an electricity grid.

Preferably, the electric power source comprises a variable-frequency drive, and may be connected to an electricity grid. The electric power source may comprise a battery.

Preferably, the control apparatus may be arranged to output an electric torque set-point. The electric torque set-point may have a value which is above a set-point threshold. This has the advantage that the coupling point, i.e. the point where the machine is stabilized and may be coupled to the grid, is outside of the "S-zone".

The control apparatus may comprise one or more controllers. For example, the control apparatus may comprise a single controller to process the speed difference between the rotational speed of the hydraulic machine and the target rotation speed; output the orientation set point; and/or the electric torque set-point.

Alternatively, these functions may be carried out by a first controller and a second controller. The first controller or orientation set point controller is preferably arranged to output the orientation set point. The first control loop may comprise the first controller so that it may form part of the first control loop. The second controller or electric torque set-point controller may be arranged to output an electric torque set-point. The second control loop may comprise the second controller so that it may form part of the second control loop.

It is to be appreciated that one or more of the aspects, embodiments and features of any of the above aspects or embodiments of the invention may be readily combined, as will be readily apparent to the skilled person. Furthermore, the foregoing advantages may relate to more than aspect of the present invention.

Other features and advantages will become apparent from the following description, given only by way of example, in view of the following drawings in which.

Figure 1:
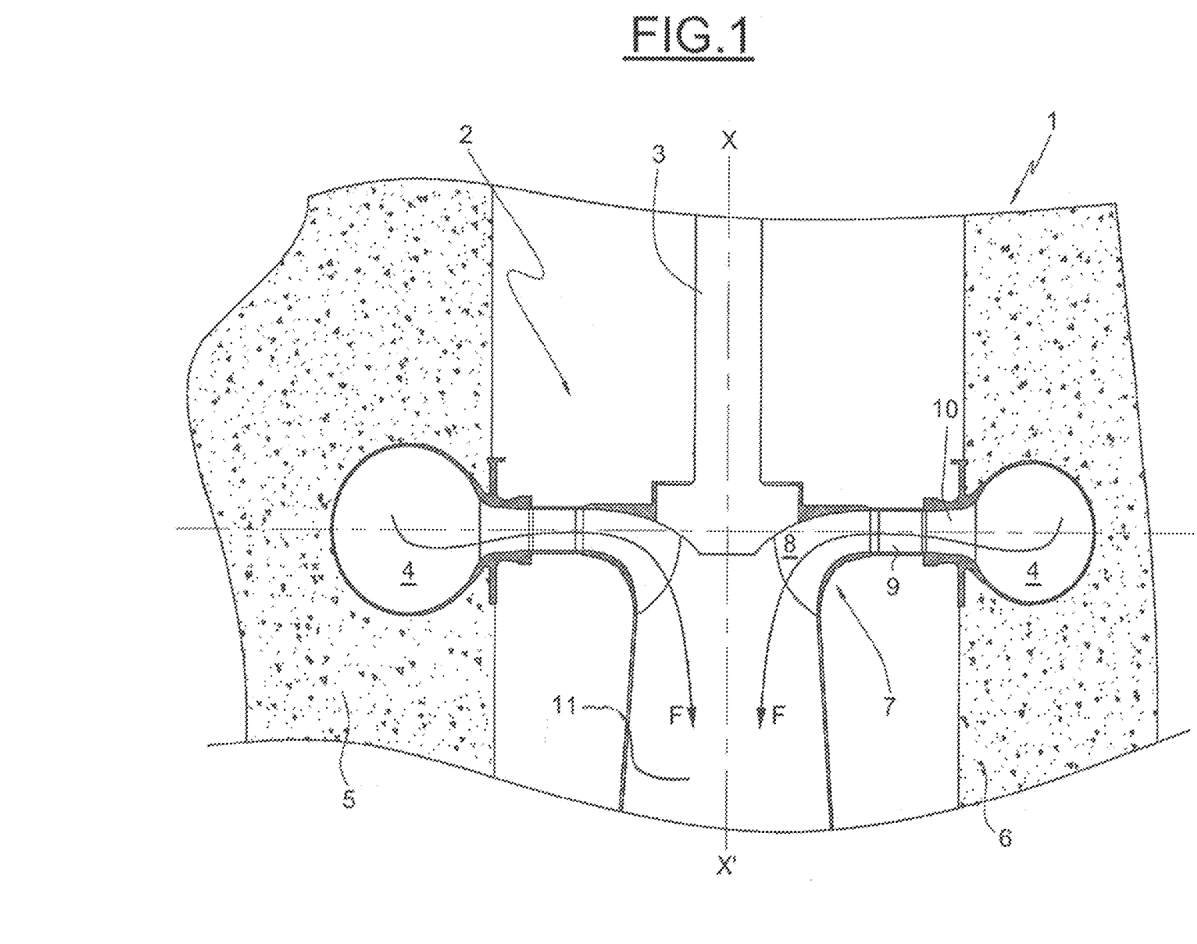
FIG. 1 is a schematic section of an installation for converting hydraulic energy into electrical energy comprising a pump-turbine.

Reference is first made to FIG. 1 which represents an installation 1 for converting hydraulic energy into electrical energy. The installation 1 includes a hydraulic machine which is subject to S-characteristics. In the example described herein, the hydraulic machine is a pump-turbine 2 that uses, in a turbine mode, hydraulic energy to set a shaft 3 in rotation. The shaft 3 is coupled to the rotor of a generator having an alternator that converts mechanical energy of the rotating rotor into electrical energy.

The functioning of the pump-turbine 2 is described below in turbine mode. The pump-turbine 2 includes a volute 4 that is supported by concrete blocks 5, 6. For example, a non-represented penstock extends between a non-represented upstream reservoir and the volute 4. This penstock generates a forced water flow F to power the machine 2.

The machine 2 includes a runner 7 coupled to the shaft 3 that is surrounded by the volute 4 and that includes blades 8 between which water flows in operating conditions. As a result, the runner 7 rotates around an axis X-X' of the shaft 3.

A distributor is arranged around the runner 7. It includes a plurality of movable guide vanes 9 that are evenly distributed around the runner 7. A pre-distributor is disposed upstream of and around the distributor. The pre-distributor is formed by a plurality of fixed vanes 10 evenly distributed around the axis of rotation X-X' of the runner 7.

A suction pipe 11 is disposed below the runner 7 and is adapted to evacuate water downstream.

The guide vanes 9 of the distributor have each an adjustable pitch around an axis parallel to the axis of rotation X-X' of the runner 7. Consequently, the guide vanes 9 may be swiveled to regulate the water flow rate. The guide vanes 9 are all oriented with the same angle relative to a closed position.

Figure 2:
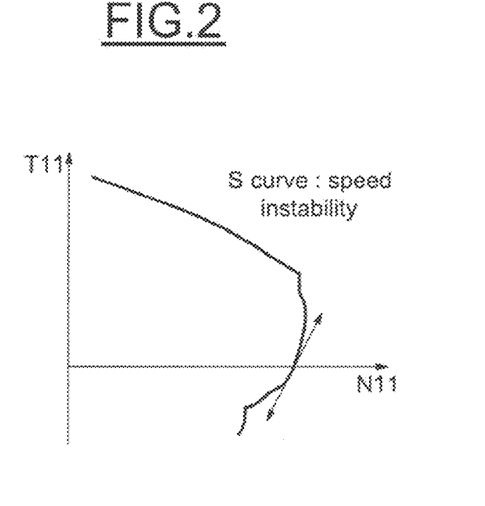
FIG. 2 is a graph representing characteristics, in turbine mode, of the pump-turbine of the installation of FIG. 1.
Figure 3:
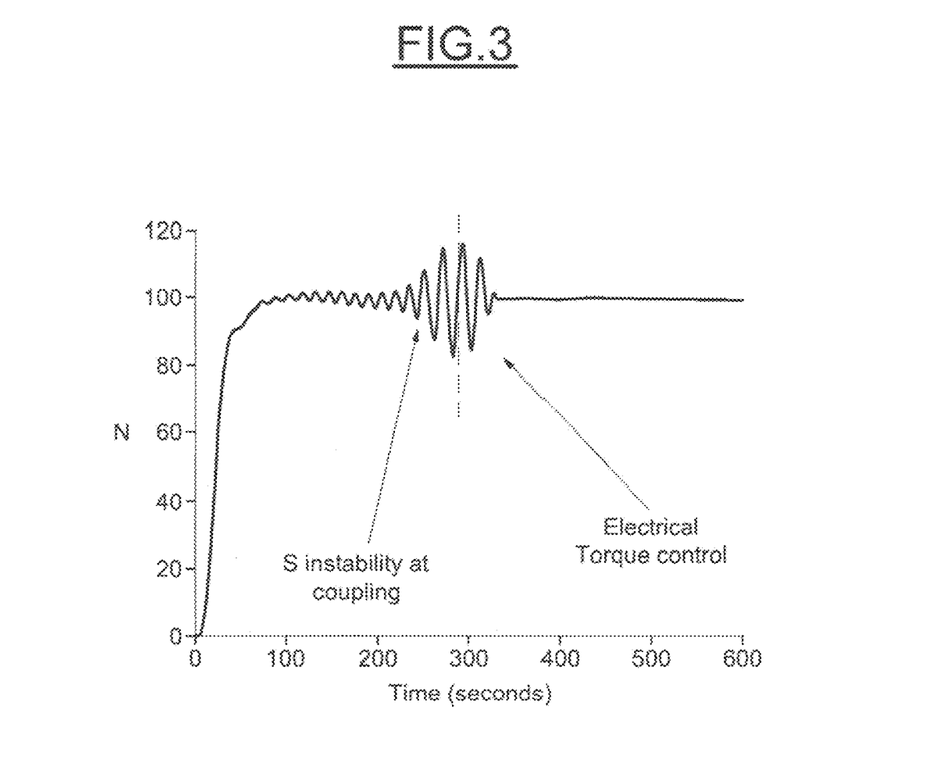
FIG. 3 is a graph representing the rotation speed of the machine, plotted over time, in a turbine mode of the pump-turbine of the installation of FIG. 1.

Reference is now made to FIGS. 2 and 3 which illustrate curves representing a parameter T11 that corresponds to the hydraulic torque applied to the runner 7, plotted over a parameter N11 that corresponds to the rotation speed of the machine 2 at a given opening of the guide vanes 9 (FIG. 2) and the rotation speed N plotted over time (FIG. 3).

Referring to FIG. 2, the iso-opening curve of the parameter T11 depending on the hydraulic torque, plotted over parameter N11 depending on the rotation speed, exhibits an S-portion in which the curve has a positive slope for which a slight increase of the parameter N11 results in a significant increase in the parameter T11.

In other words, a slight variation of the rotation speed results in a significant increase of the torque applied to the machine 2. As will be appreciated, stabilization of the machine rotation speed is difficult to achieve (FIG. 3) under these conditions.

Figure 4:
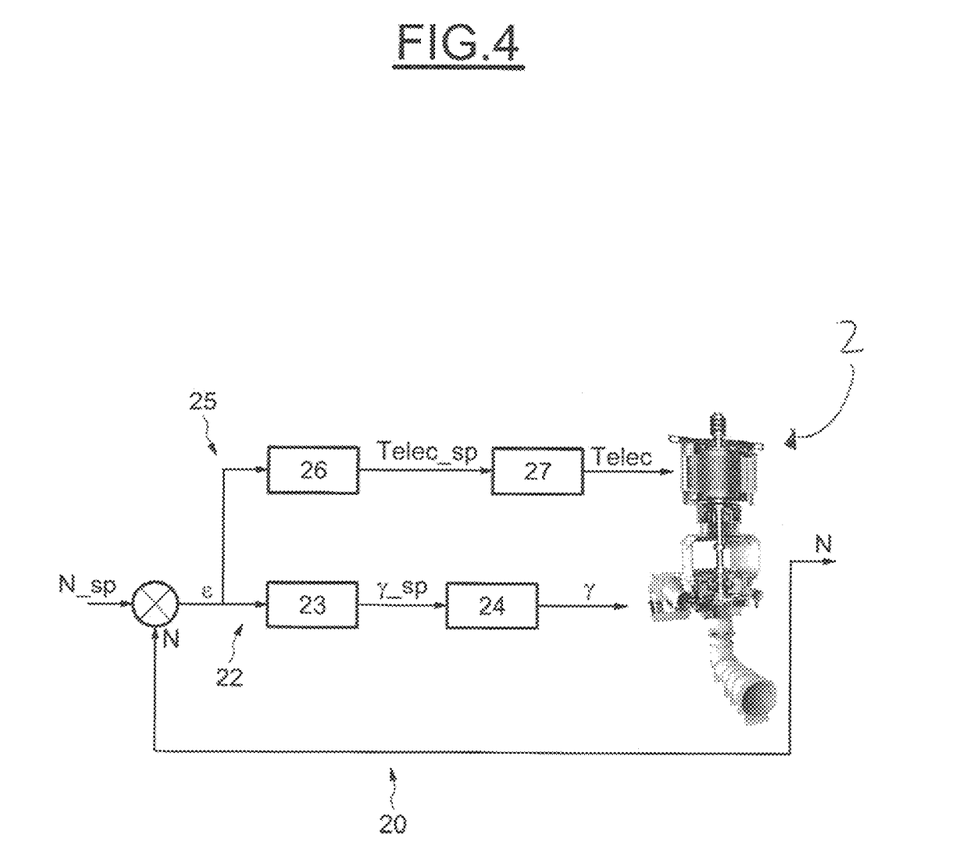
FIG. 4 is a control scheme illustrating a method according to the invention that aims at stabilizing the rotation speed of a pump-turbine belonging to the installation of FIG. 1.

A method for stabilizing the rotation speed of the hydraulic machine according to the invention is implemented by means of a control loop feedback system 20, as shown in FIG. 4. The control loop feedback system 20 comprises a first control loop 22 comprising a guide vane controller 23 that takes as an input a speed difference ε between the rotational speed N of the hydraulic machine and a target rotation speed N_sp. The first control loop 22 also comprises a guide vane actuator 24.

The first controller 23 processes the speed difference ε and outputs an orientation control set-point γ_sp to the guide vane actuator 24. The orientation control set-point γ_sp corresponds to the optimum guide vane orientation γ to stabilize the hydraulic machine. The guide vane actuator 24 orientates the guide vanes according to the optimum orientation γ.

For example, the rotation speed of the turbine 2 can be determined by measuring the frequency of the generator coupled to the shaft 3.

The guide vane controller 23 may, for example, be a Proportional Integral Derivative controller (PID).

In addition, the control loop feedback system 20 comprises a second control loop 25 comprising an electric torque controller 26 that takes as an input the speed difference ε between the rotation speed N of the hydraulic machine and the target rotation speed N_sp to output an electric torque set-point Telec_sp. The control loop feedback system 20 also comprises an electric power source 27 that accordingly affects the electric torque Telec provided to the rotor.

In a further embodiment of the invention, a single main controller is configured to perform the functions of one or both of the guide vane controller 23 and the electric torque controller 26.

The electric torque set-point is calculated by the controller 26 to accelerate or decelerate the machine rotation speed to reduce or eliminate the speed difference ε.

In one embodiment, the second controller 26 is a variable-frequency drive controller, for example a static frequency converter (SFC) controller.

The second control loop 25 thus comprises a variable-frequency drive for example a static frequency converter. The static frequency converter may be a voltage source inverter or a current source inverter. The variable-frequency drive is connected to an electricity distribution grid and controlled by the variable-frequency drive controller 26 to provide either a positive or a negative electric torque to the generator.

As previously indicated, the variable-frequency drive may comprise a static frequency converter (SFC) and comprise a rectifier stage connected to the grid to produce a direct current and an inverter stage for voltage and frequency conversion.

Figure 5:
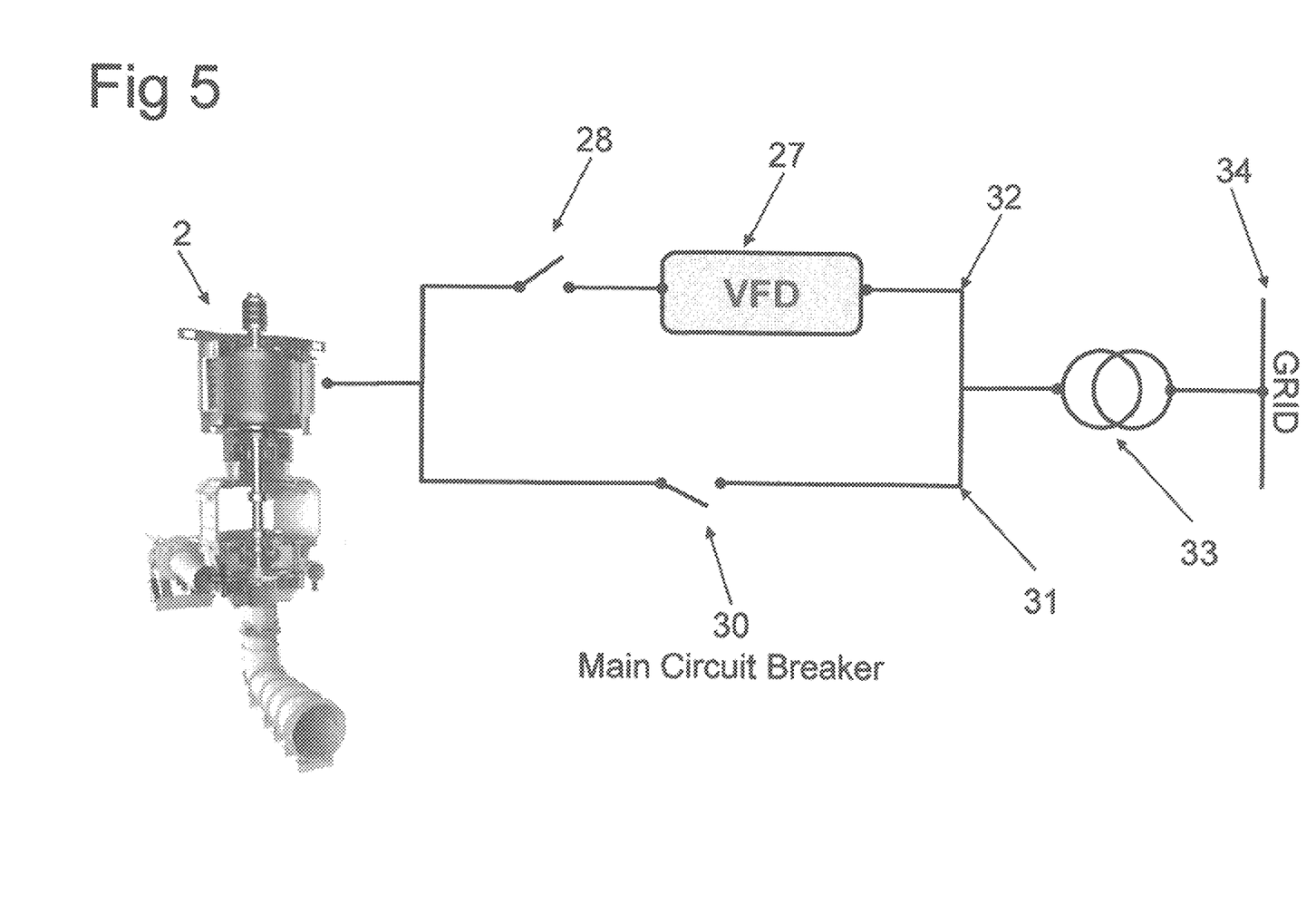
FIG. 5 is a schematic drawing illustrating the variable-frequency drive unit and the power connections existing between it, the grid and the pump-turbine.

FIG. 5 illustrates an embodiment of the invention in which the variable frequency drive 27 provides an electrical torque to the pump-turbine machine 2. A circuit breaker 28 links the variable-frequency drive 27 with the machine 2. When the circuit breaker 28 is in a closed position the variable frequency drive 27 provides the electrical torque to the machine 2. At the same time a main circuit breaker 30 located between the machine 2 and the grid 34 is in an open position. The variable frequency drive (VFD) 27 is powered by the grid 34 via an AC transformer 33 and VFD cable 32.

Once the rotational speed of the machine 2 is stabilized, the frequencies on each side of the main circuit breaker 30 are equalized. Once equalization has been achieved, connection of the machine 2 to the grid 34 is performed by closing the main circuit breaker 30 and opening circuit breaker 28. Power is then provided directly to the grid 34 through a grid line 31 in generation operation.

The variable-frequency drive 27 may comprise switching cells using diodes and transistors or thyristors working as switches which may be controlled by the VFD controller 26 to produce the desired electric torque.

Figure 6:
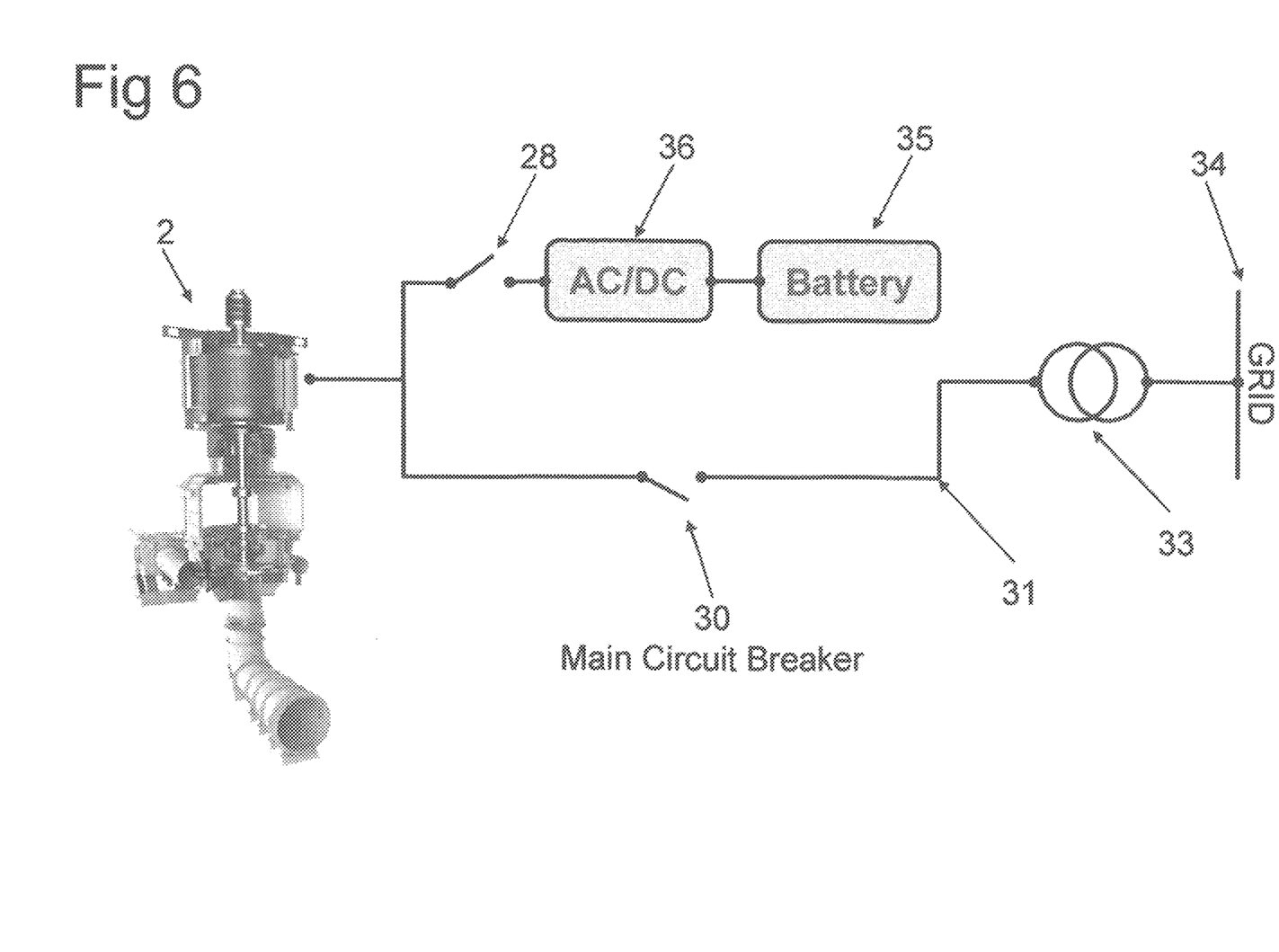
FIG. 6 is a schematic drawing illustrating another embodiment of the invention which includes a battery, a DC/AC power conversion unit and the connections existing between them, the grid and the pump-turbine.

FIG. 6 illustrates an alternative way to provide an electrical torque to the machine 2. Identical features found in FIG. 6 retain the reference numerals of FIG. 5.

In this alternative embodiment a battery 35 is used instead of the variable frequency drive 27. A DC/AC conversion unit 36 provides the electrical power of the battery 35 to the machine 2 via the circuit breaker 28. When the battery 35 provides the electrical power of the battery 35 to the machine 2, the circuit breaker 28 is in closed position and a main circuit breaker 30 is in an open position.

Once the speed of the pump-turbine 2 is stabilized, the frequencies on each side of the main circuit breaker 30 are equal. This enables connection of the machine 2 to the grid 34 which is achieved by closing main circuit breaker 30 and opening circuit breaker 28. The power is then provided directly to the grid 34 through the grid line 31 and AC transformer 33 in generation operation.

According to another embodiment of the invention, the electric power source comprises a battery 35 connected to the generator of the machine 2, wherein the battery 35 is arranged to be charged by the grid 34.

For example, the battery 35 may comprise an internal control stage connected to the controller 26 in order to provide the generator of the machine 2 with a positive or a negative electric torque to adjust the rotation speed of the machine 2 to the target speed value.

According to another embodiment of the invention, the second control loop 25 comprises a variable-frequency drive governed by a VFD controller and a battery governed by a battery controller. The battery and battery controller are connected in parallel to the variable-frequency drive to provide the generator of the machine 2 with an electric torque to adjust the rotation speed of the machine 2.

It should be appreciated that the invention, which comprises a control loop feedback system comprising (i) a first loop with, in some embodiments, a turbine speed load governor (TSLG) controller used to output an opening value to affect the guide vanes; and (ii) a second control loop having an electric power source providing the generator of the machine with an electric torque, may provide a first coarse regulation in which the speed difference is reduced by the first control loop and a fine regulation in which the speed difference $\varepsilon$ is reduced by the second control loop 25.

For example, the first control loop may be used to regulate the rotation speed of the machine 2 around a desired value and the second loop is used to dynamically compensate for the speed error.

For example, 100% of the power may be provided by the hydraulic torque, while 10% of the power, corresponding to the error range may be provided by the additional electric torque source.

According to a further embodiment of the invention, the controller 26 provides an electrical setpoint Telec_sp which is maintained above a setpoint threshold Telec_threshold. This results in an electrical counter-torque applied to the machine 2 which exceeds a set counter-torque threshold.

To counteract the setpoint threshold Telec_threshold, a positive hydraulic torque is provided to the turbine 7 by the guide vane actuator 24. In order for the speed difference $\varepsilon$ to become negligible and stabilization of the speed to occur, the controller 23 may be a classical PID which orientates the guide vanes 9 via the guide vane actuator 24. Accordingly, the controller 23 provides a corresponding command $\gamma$_sp to stabilize the speed of the machine.

By applying an electrical setpoint Telec_sp which is above a setpoint threshold Telec_threshold and a corresponding counter torque to the machine 2, the coupling operating point is located in a naturally stable zone of the hydraulic turbine 7 outside of the "S-zone" of the turbine characteristic.

As can be seen in FIG. 2, the slope of the T11/N11 curve becomes positive above a certain threshold of T11. The threshold Telec_threshold is chosen in order to move the hydraulic point outside the "S-zone".

The aforementioned embodiments are not intended to be limiting with respect to the scope of the appended claims. Furthermore, features of one or more of the above embodiments may be readily combined with one or more features of another embodiment. It is also contemplated by the inventors that various substitutions, alterations, and modifications may be made to the invention without departing from the scope of the invention as defined by the claims.

The invention claimed is:

1. A method for stabilizing the rotational speed of a hydraulic machine in turbine mode for coupling the hydraulic machine to a grid, the hydraulic machine comprising a distributor adapted to modify a water flow, wherein the method comprises the steps of:
   calculating a speed difference ($\varepsilon$) between the rotational speed (N) of the hydraulic machine and a target rotational speed (N_sp);
   using the speed difference ($\varepsilon$) as an input, calculating an orientation ($\gamma$) of the distributor by a control loop feedback system having a first control loop;
   orienting the distributor according to the calculated orientation ($\gamma$);
   using the speed difference (a) as an input to a second control loop having an electric torque controller, outputting an electric torque set-point (Telec_sp);
   applying an electric torque (Telec) to the hydraulic machine corresponding to the electric torque set-point (Telec_sp).

2. The method according to claim 1, wherein the method comprises coupling the hydraulic machine to a grid.

3. The method according to claim 2, wherein the step of coupling the hydraulic machine to the grid comprises at least one of the following steps:
   opening an electric torque circuit breaker between the source of the electric torque and the machine;
   closing a grid circuit breaker between the hydraulic machine and the grid.

4. The method according to claim 1, wherein the method comprises processing the speed difference ($\varepsilon$) to output at least one of:
   an orientation control set-point ($\gamma$_sp).

5. The method according to claim 4, wherein the orientation control set-point ($\gamma$_sp) is received by an actuator to orientate the distributor.

6. The method according to claim 1, wherein the electric torque (Telec) is provided by at least one of:
- an electric power source to reduce the speed difference ($\varepsilon$);
- a variable-frequency drive;
- a battery.

7. The method according to claim 6, wherein the electric torque (Telec) is provided by the electric power source that is connected to the grid.

8. The method according to claim 1, wherein orienting the distributor according to orientation ($\gamma$) provides a coarse regulation, and applying the electric torque to the hydraulic machine provides a fine regulation.

9. A system for converting hydraulic energy into electrical energy, the system comprising:
- a hydraulic machine comprising a distributor adapted to modify a water flow, and a rotor that is rotated by operation of the hydraulic energy;
- a first control loop comprising a controller, the first control loop configured to use a speed difference ($\varepsilon$) between a rotational speed (N) of the hydraulic machine and a target rotational speed (N_sp) as an input to calculate an orientation of the distributor and orientate the distributor according to the calculated orientation; and
- a second control loop comprising an electric torque controller that uses the speed difference ($\varepsilon$) as an input, the second control loop configured to output an electric torque set-point (Telec_sp) and provide an electric torque (Telec) to the rotor corresponding to the electric torque set-point (Telec_sp) so as to reach a target rotational speed (N_sp) of the hydraulic machine.

10. The system according to claim 9, wherein the first control loop is configured to output an orientation set point ($\gamma$_sp) for the distributor.

11. The system according to claim 9, wherein the first control loop comprises an actuator arranged to orientate the distributor.

12. The system according to claim 9, wherein the second control loop comprises an electric power source arranged to provide the electric torque (Telec) to the hydraulic machine to reduce the speed difference ($\varepsilon$).

13. The system according to claim 12, further comprising an electric source circuit breaker between the electric power source and the machine.

14. The system according to claim 12, wherein the electric power source comprises at least one of a variable-frequency drive or comprises a battery.

15. The system according to claim 12, wherein the electric power source is connected to an electricity grid.

16. The system according to claim 9, further comprising a grid circuit breaker between the hydraulic machine and an electricity grid.

17. The system according to claim 9, wherein the electric torque set-point (Telec_sp) has a value above a threshold (Telec_threshold).

* * * * *